M. J. TODD.
WAGON.
APPLICATION FILED APR. 25, 1913.
1,087,153.
Patented Feb. 17, 1914.
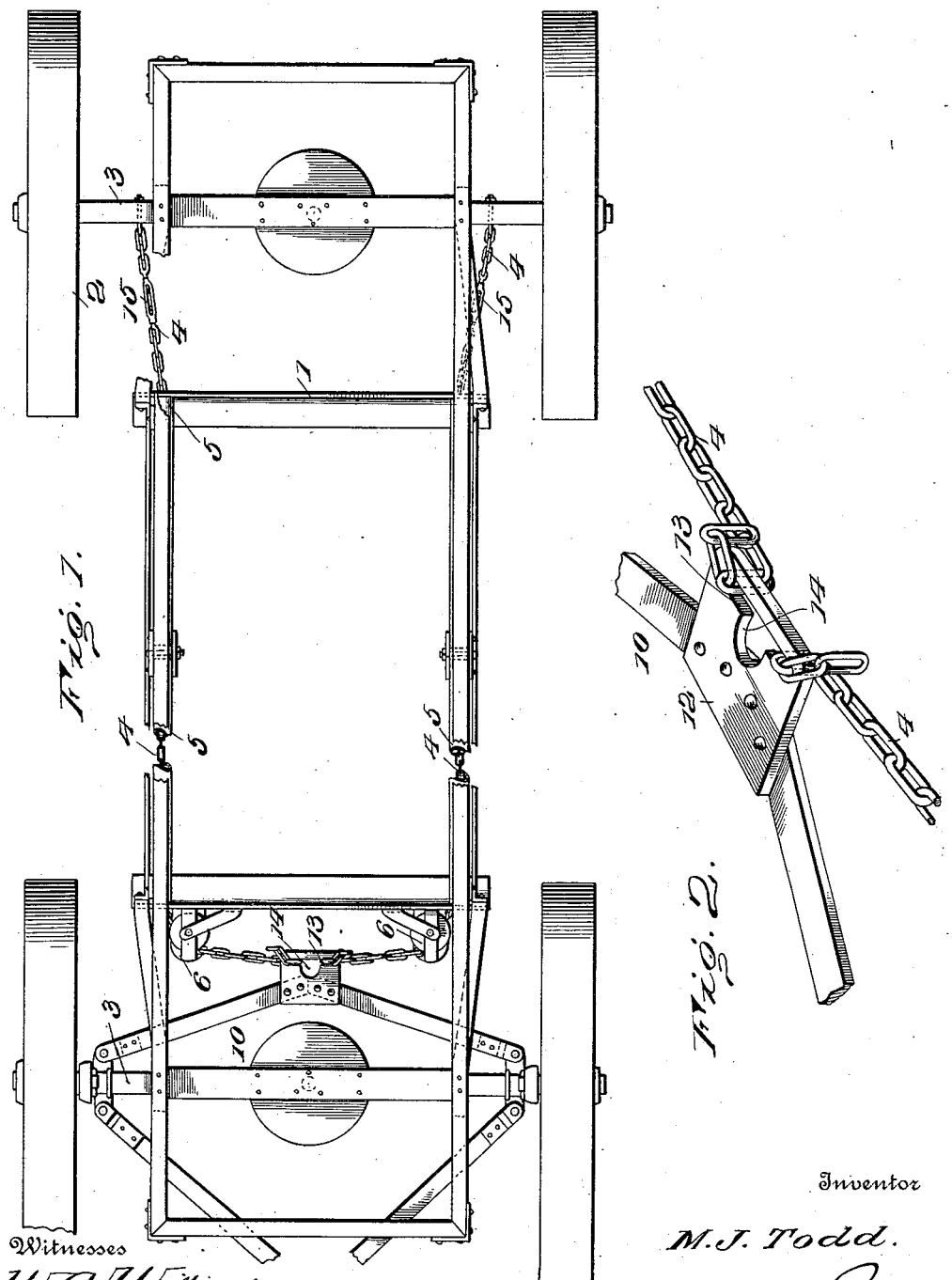
Witnesses
Inventor
M. J. Todd.
By
Attorney

UNITED STATES PATENT OFFICE.

MARQUIS J. TODD, OF BUFFALO, NEW YORK, ASSIGNOR TO BUFFALO PITTS COMPANY, OF BUFFALO, NEW YORK, A CORPORATION OF NEW YORK.

WAGON.

1,087,153.  Specification of Letters Patent.  Patented Feb. 17, 1914.

Application filed April 25, 1913. Serial No. 763,587.

*To all whom it may concern:*

Be it known that I, MARQUIS J. TODD, of Buffalo, in the county of Erie and State of New York, have invented new and useful Improvements in Wagons; and I do hereby declare the following to be a full, clear, and exact description of the invention, such as will enable others skilled in the art to which it appertains to make and use the same.

In Letters Patent of the United States No. 1,020,524, dated March 19, 1912, I showed and described flexible cross reaches connected to two pivoted axles and extending in substantial parallelism with the sides of a wagon body and transversely thereof at a point near one of the axles, such flexible reaches being connected to both axles at points on opposite sides of the pivots.

The object of my invention is to improve upon the means shown and described in said patent; to obviate undue wear on the chains, and avoid likelihood of their being broken by torsional strain. And a further object is to provide simple and highly efficient means for readily and easily adjusting the chains.

In the accompanying drawings, Figure 1 is a plan view of a dumping wagon constructed in accordance with my present invention. Fig. 2 is an enlarged detail view.

Referring to the drawings, 1 designates the body of a wagon; 2 the carrying-wheels; and 3 the two axles therefor which are shown as centrally pivoted.

The reaches comprise two side chains 4 which are directly connected to one of the axles on opposite sides of its pivot and extend through guides 5 which are shown in the form of pipes extending along the opposite longitudinal sides of the wagon, and each chain, after leaving the guide pipes, engages a roller 6 and is carried to a point centrally of the longitudinal axis of the vehicle, and about in line with the pivot of the adjacent axle. At this point both chains detachably engage a frame 10, which is secured to the adjacent axle. I have shown this frame as composed of two divergent arms which are secured at their outer ends to the axle at points equi-distant from the pivot thereof, and at the convergence or meeting portions of these arms is a plate-like member 12 having a narrow longitudinal slot 13 and a central semi-circular opening 14. By inserting the chains through this opening they may be drawn toward the respective ends of the narrow slot 13 and thereby be fixedly held. When it is desired to adjust the chains, either by letting out or taking up an additional link, it is only necessary to move one chain at a time toward the central cut-out, and after the adjustment is obtained replace one of the links in the narrow slot. As an additional means for compensating for wear or for obtaining the desired adjustment each chain may have a turn-buckle 15 forming a part thereof.

It will be seen that by connecting the chains composing the reach to a common point in line with the pivot of one of the axles the danger of undue strain upon the chains, as by one of the wheels riding over an obstruction, is obviated, and by having the chains engage the slotted plate they may be readily and easily adjusted. The present improvement lessens the number of parts, and hence reduces the cost of manufacture.

I claim as my invention:

1. A wagon having, in combination, two pivoted axles and carrying wheels thereon, a body, flexible cross reaches connected to one of the axles and extended in substantial parallelism with the sides of the body and transversely thereof, and fixed members connected to the other axle at points on opposite sides of the pivot thereof and to which said chains are connected at a point in line with the pivot of said axle.

2. A wagon having, in combination, two pivoted axles and carrying wheels thereon, a body, flexible cross reaches connected to one of the axles and extended in substantial parallelism with the sides of the body and transversely thereof, and fixed members connected to the other axle at points on opposite sides of the pivot thereof and to which said chains are adjustably connected at a point in line with the pivot of said axle.

3. A wagon having, in combination, two pivoted axles and carrying wheels thereon, a body, flexible cross reaches connected to one of the axles and extended in substantial parallelism with the sides of the body and transversely thereof, and fixed members connected to the other axle at points on opposite sides of the pivot thereof and having an opening to receive and hold said chains at a point opposite the pivot of said axle.

4. A wagon having, in combination, two pivoted axles and carrying wheels thereon, a body, flexible cross reaches connected to one of the axles and extended in substantial parallelism with the sides of the body and transversely thereof, and fixed members connected to the other axle at points on opposite sides of the pivot thereof and having an opening and a narrow slot extending in opposite directions from said opening, said chains being passed through said opening and held by being positioned in said slots.

In testimony whereof, I have signed this specification in the presence of two subscribing witnesses.

MARQUIS J. TODD

Witnesses:
 FRANCIS S. MAGUIRE,
 MILDRED P. IMIRIE.

Copies of this patent may be obtained for five cents each, by addressing the "Commissioner of Patents, Washington, D. C."